(12) United States Patent
Haddadian et al.

(10) Patent No.: US 11,300,009 B2
(45) Date of Patent: Apr. 12, 2022

(54) CONNECTION DEVICE FOR A TURBOCHARGER, AND TURBOCHARGER

(71) Applicant: IHI Charging Systems International GmbH, Amt Wachsenburg OT Ichtershausen (DE)

(72) Inventors: Farhad Haddadian, Heidelberg (DE); Klaus Sperling, Heidelberg (DE)

(73) Assignee: IHI Charging Systems International GmbH, Amt Wachsenburg OT Ichtershausen (DE)

(*) Notice: Subject to any disclaimer, the term of this patent is extended or adjusted under 35 U.S.C. 154(b) by 284 days.

(21) Appl. No.: 16/614,171

(22) PCT Filed: Jul. 4, 2018

(86) PCT No.: PCT/EP2018/000341
§ 371 (c)(1),
(2) Date: Nov. 15, 2019

(87) PCT Pub. No.: WO2019/011464
PCT Pub. Date: Jan. 17, 2019

(65) Prior Publication Data
US 2021/0340882 A1    Nov. 4, 2021

(30) Foreign Application Priority Data
Jul. 14, 2017 (DE) .................... 10 2017 115 935.5

(51) Int. Cl.
*F01D 25/24* (2006.01)
*F01D 25/28* (2006.01)
*F02C 6/12* (2006.01)

(52) U.S. Cl.
CPC ........... *F01D 25/243* (2013.01); *F01D 25/28* (2013.01); *F02C 6/12* (2013.01); *F05D 2220/40* (2013.01);
(Continued)

(58) Field of Classification Search
CPC ........ F01D 25/243; F01D 25/28; F01D 25/26; F02C 6/12; F05D 2240/40; F16B 9/02; F16B 9/023
See application file for complete search history.

(56) References Cited

U.S. PATENT DOCUMENTS 978,398 A    12/1910  Rischard
2,548,216 A   4/1951  Houghton et al.
(Continued)

FOREIGN PATENT DOCUMENTS

CN    1433501 A    7/2003
CN  105593590 A    5/2016
(Continued)

OTHER PUBLICATIONS eEuroparts.com: SAAB Pipe Clamp (55559479). URL: http://www.eeuroparts.com/Parts/33472/Pipe-Clamp-Turbo-Inlet-55559479/ archived copy as of Aug. 26, 2016 retrieved from https://web.archive.org/web/20160826013409/https://www.eeuroparts.com/Parts/33472/Pipe-Clamp-Turbo-Inlet-55559479/ on Sep. 16, 2019.

*Primary Examiner* — David E Sosnowski
*Assistant Examiner* — Maxime M Adjagbe
(74) *Attorney, Agent, or Firm* — Smartpat PLC (57) ABSTRACT

A connection device for an exhaust gas turbocharger has a bent first element with a first tensioning arm at a first end. A second bent element has a second tensioning arm at a second end opposite the first end. A third end of the first element is formed opposite a fourth end of the second element. The first tensioning arm and the second tensioning arm are connectable by a first connecting element. The third end and the fourth end are movably connected with each other by a second connecting element. A transition is elastically formed between the respective tensioning arm and a supporting portion of the particular element, which extends (Continued)

between the tensioning arm and the third or fourth, respectively, end. The first element or the second element is formed in a profiled manner.

12 Claims, 5 Drawing Sheets

(52) U.S. Cl.
CPC ...... *F05D 2250/13* (2013.01); *F05D 2250/75* (2013.01); *F05D 2250/90* (2013.01); *F05D 2260/31* (2013.01)

(56) References Cited

U.S. PATENT DOCUMENTS

| | | | |
|---|---|---|---|
| 3,635,506 | A | 1/1972 | Womble et al. |
| 3,788,677 | A | 1/1974 | Stade et al. |
| 4,606,111 | A | 8/1986 | Okazaki et al. |
| 5,131,698 | A | 7/1992 | Calmettes et al. |
| 5,782,499 | A | 7/1998 | Gfrerer et al. |
| 5,905,231 | A | 5/1999 | Houte et al. |
| 5,940,939 | A | 8/1999 | Geppert |
| 6,383,315 | B1 | 5/2002 | Kreipe et al. |
| 6,702,338 | B2 | 3/2004 | Vanasse |
| 6,951,450 | B1 | 10/2005 | Figura et al. |
| 7,055,223 | B2 | 6/2006 | Cassel et al. |
| 7,341,287 | B2 | 3/2008 | Gibb et al. |
| 8,662,544 | B2 | 3/2014 | Broderick et al. |
| 9,039,046 | B2 | 5/2015 | Beagen, Jr. |
| 9,593,788 | B2 | 3/2017 | Rigollet et al. |
| 10,612,705 | B2 | 4/2020 | Prevot |
| 11,035,395 | B2 | 6/2021 | Haddadian |
| 2005/0253029 | A1 | 11/2005 | Gibb et al. |
| 2007/0022574 | A1 | 2/2007 | Belisle et al. |
| 2007/0176425 | A1 | 8/2007 | Ma et al. |
| 2010/0296925 | A1* | 11/2010 | Sakai ............... F01D 25/243 415/214.1 |
| 2013/0091832 | A1 | 4/2013 | Friedrich et al. |
| 2015/0008663 | A1 | 1/2015 | Drivon et al. |
| 2015/0204471 | A1* | 7/2015 | Sato ............... F16L 33/04 24/284 |
| 2015/0267729 | A1 | 9/2015 | Baudoin et al. |
| 2015/0315954 | A1 | 11/2015 | Edemann |
| 2016/0223104 | A1 | 8/2016 | Webb et al. |
| 2016/0363244 | A1 | 12/2016 | Ignaczak et al. |
| 2017/0328501 | A1* | 11/2017 | Motoyama ............ F16L 23/08 |
| 2020/0149569 | A1 | 5/2020 | Haddadian et al. |
| 2021/0332720 | A1 | 10/2021 | Haddadian et al. |
| 2021/0340882 | A1 | 11/2021 | Haddadian et al. |

FOREIGN PATENT DOCUMENTS

| | | |
|---|---|---|
| CN | 110869623 A | 3/2020 |
| CN | 110914522 A | 3/2020 |
| DE | 19534437 A1 | 3/1997 |
| DE | 19650674 A1 | 6/1998 |
| DE | 102012218201 A1 | 4/2013 |
| DE | 102014103683 A1 | 9/2015 |
| EP | 0085021 A1 | 8/1983 |
| EP | 0928921 A1 | 7/1999 |
| EP | 2233719 A1 | 9/2010 |
| EP | 3246612 A1 | 11/2017 |
| GB | 2518220 A | 3/2015 |
| GB | 2528094 A | 1/2016 |
| WO | 2014016721 A1 | 1/2014 |
| WO | 2014071950 A1 | 5/2014 |
| WO | 2019011462 A1 | 1/2019 |
| WO | 2019011463 A1 | 1/2019 |
| WO | 2019011464 A1 | 1/2019 |

* cited by examiner

CONNECTION DEVICE FOR A TURBOCHARGER, AND TURBOCHARGER

TECHNICAL FIELD

The invention relates to a connection device for an exhaust gas turbocharger and to an exhaust gas turbocharger.

BACKGROUND

An exhaust gas turbocharger suitably consists of several casing sections: A first casing section which generally is flown through by hot gases, normally by exhaust gas of a combustion engine, a second casing section which is configured to accommodate a rotor assembly which is rotatably supported in the second casing section and is positioned between the first casing section and a third casing section which may generally be flown through by ambient air. Flange surfaces are formed between the individual casing sections in such a manner that these flange surfaces are contacting each other so that the hot gas and the ambient air are prevented as far as possible from escaping. If leakages occur between the flange surfaces, the total efficiency of the exhaust gas turbocharger will be reduced, on the one hand, and, on the other hand, environmentally harmful exhaust gases will exit between the first casing section and the second casing section, which has to be prevented. It has to be taken into consideration that the exhaust gas turbocharger should be able to be disassembled, i.e. that for example a material bond connection between the individual flange surfaces might provide tightness between the flange surfaces, however, the exhaust gas turbocharger may then no longer be able to be easily disassembled and reinstalled.

A connection between the first casing section which is flown through by exhaust gas and the second casing section which is flown through by air or lubricant and/or water is highly problematic, because here large temperature differences as well as variations between the casing sections occur. This means that the connection device has to compensate for different thermal expansion of the casing sections and is itself subject to different and varying stress.

The connection device is usually formed like a pipe clamp, wherein two elements extending over a circumference of the connection device are at their ends facing each other detachably connected at least on one side by means of a screw-bolt connection.

From the laid open publication DE 10 2014 103 683 A1, for example, a profiled clamp may be taken, whose ends of the elements facing one another in the region of the screw-bolt connection are provided with a nose each so that flange portions of the elements are preferably exclusively in contact with the noses. The elements are profiled and comprise flanks which are formed trapezoidal because the profiled clamp is intended for making a taper flange connection.

Due to the high thermal load of the connection device, an expansion and a subsequent displacement of the connection may occur.

SUMMARY

The object of the present disclosure is to provide a connection device for an exhaust gas turbocharger which ensures a reliable connection. The additional object is the indication of an improved exhaust gas turbocharger.

This object is solved by a connection device for an exhaust gas turbocharger as described. The additional object is achieved by an exhaust gas turbocharger as described.

The disclosure relates to a connection device for an exhaust gas turbocharger with an essentially bent first element and an essentially bent second element, wherein the first element comprises a radially extending first tensioning arm at a first end and the second element comprises a radially extending second tensioning arm at a second end opposite the first end, and wherein a third end of the first element facing away from the first end is formed opposite a fourth end of the second element and facing away from the second end, which is movable with it. The first tensioning arm comprises a first stop facing away from the third end, and the second tensioning arm comprises a second stop opposite the first stop. The first tensioning arm and the second tensioning arm are connectable by means of a first connecting element of the connection device. The third end and the fourth end are movably connected with each other by means of a second connecting element. A transition is elastically formed between the respective tensioning arm and a supporting portion of the particular element, which extends between the tensioning arm and the third or fourth end, respectively, to reduce stress in both tensioning arms, wherein the first element comprises the movable connection by means of the second connecting element at its first end portion facing away from the first tensioning arm with the second element at its second end portion facing away from the second tensioning arm, and wherein at least the first element and/or the second element is/are formed in a profiled manner at least in the region of the second connecting element and wherein the first element and/or the second element is/are formed in the region of the second connecting element to be able to be encompassed by the same.

The advantage is to be seen in that the first element and the second element may be formed shorter, i.e. shorter in the circumferential direction, because due to the elasticity of the transitions, these may expand. This means that a deformation, in particular an expansion of the connection device by heat input, which primarily takes place in a portion of the connection device contacting a casing of the exhaust gas turbocharger, may be reduced because the elements are made shorter compared to the state of the art.

In particular, a cross-section of the transition is formed variable, starting from the tensioning arm in the direction of the supporting portion. This means in other words that, preferably, the cross-section of the transition starting from its end facing the tensioning arm to its strongest curvature decreases, while it increases relative to its cross-section starting from its strongest curvature to its end facing a supporting portion which serves to accommodate the casing of the exhaust gas turbocharger.

The movable connection by means of the second connecting element which for example may be configured band-shaped results in an improved and simplified installation of the connection device, wherein a further improvement of the installation may be obtained by making the connection with the aid of a chain link. This means that each element may be mounted relatively movably in the direction of the three-dimensional space at the chain link and that thereby a movement of the two elements relative to each other compared to, for example, a connection of the elements with an elastic connecting band is considerably enhanced.

An improvement of the distribution of the acting circumferential stress after installation into the connection device is achieved if the first element and the second element are encompassed by the second connecting element in the region of the connecting element, where they are designed profiled. The advantage of the profiled design is given by an increase of a section modulus in a cross-section of the elements.

Preferably, the elements are formed profiled not only in the region of the second connecting element, which means comprising a cross-sectional profile. Thereby an improved overall elasticity of the connection device may be achieved which leads to an improved relative adaption of the connection device to the casing sections to be connected.

In a further embodiment of the connection device, a tensile stress at the inner circumference and a compressive stress, respectively, at the outer circumference is generated in the region of the transitions, which is just high enough to enable an elastic deformation of the transitions for contact-making between the stops. Thereby, a uniform distribution of circumferential stress acting in the elements may be achieved.

In a further embodiment of the connection device, the first tensioning arm and the second tensioning arm extend oppositely directed prior to being subjected to a preload force of the first connecting element, wherein in the region of the stops a maximum distance between the tensioning arms is formed. With a mutual support of the stops after a contact, a leverage effect of the tensioning may be obtained which causes a tensile force acting on the circumference in the elements.

In a further embodiment of the connection device, the end portion is bent, encompassing the second connecting element at least partially. Particularly preferred, the end portion is configured in the shape of a crane hook. This leads to a further increase of the section modulus and thus to a better, in other words, optimized distribution of stresses in the end portions such that cracks or cracking, respectively, and distortion of the end portions are avoided.

By means of a safety element which is formed to encompass the second connecting element at least partially and is attached at the end portion of the element this is additionally secured against loss.

The second aspect relates to an exhaust gas turbocharger comprising a first casing section which may in particular be flown through by hot exhaust gas and a second casing section, wherein the first casing section and the second casing section are connected with each other by means of a connection device. The connection device is configured as described.

During operation of the exhaust gas turbocharger, the casing sections exhibit a thermal expansion due to high exhaust gas temperatures. In order to allow this thermal expansion without significantly affecting the efficiency of the exhaust gas turbocharger, the connection device is configured as described. This results in a safe connection between the casing sections and thus in a reduction or elimination of leakage of harmful substances.

Further advantages, features and details of the invention result from the following description of preferred exemplary embodiments as well as from the drawing. The above-mentioned features and feature combinations as well as the features and feature combinations in the following description of the figures and/or shown in the figures alone are not only applicable in the indicated combination but also in other combinations or alone.

DETAILED DESCRIPTION

Figure 6:
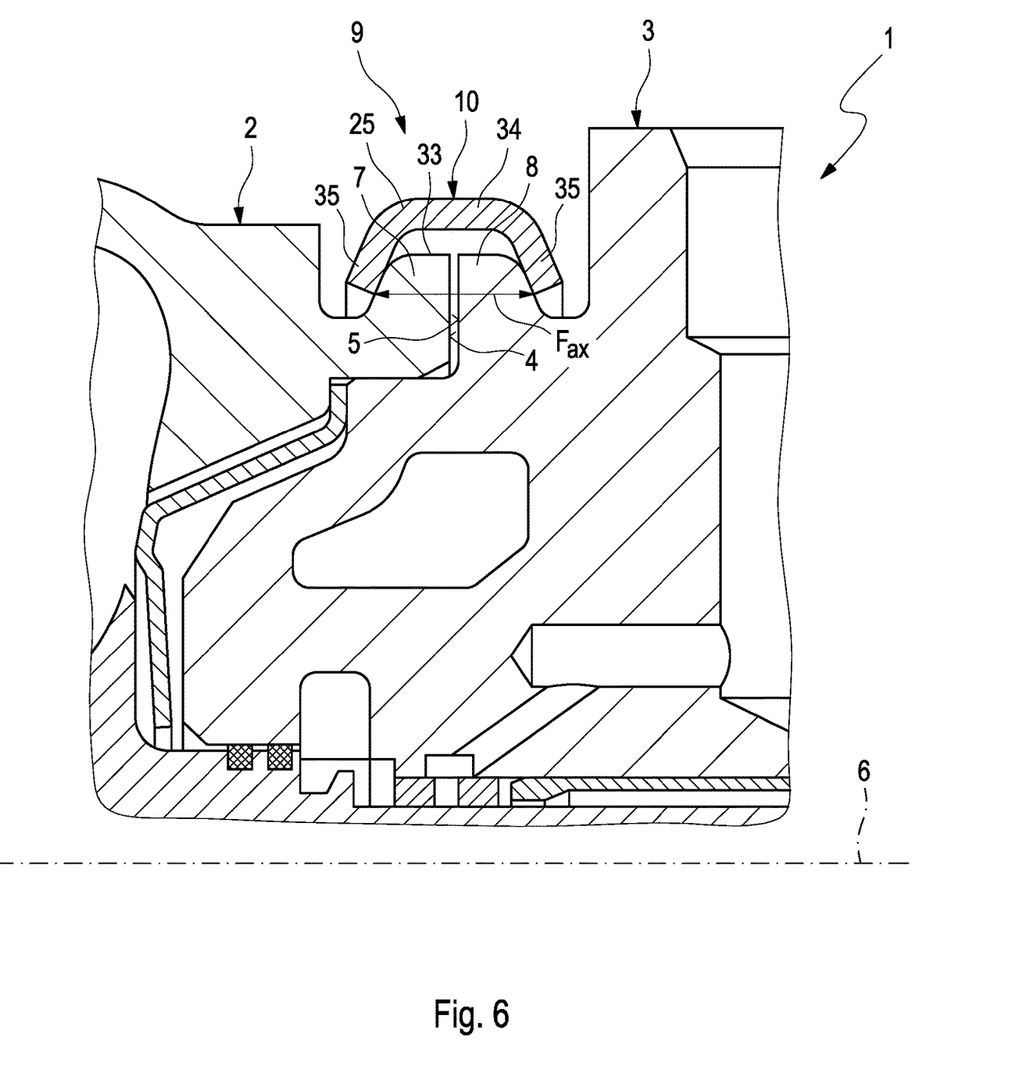
FIG. 6 shows a cut-out in a longitudinal section of an exhaust gas turbocharger.

An exhaust gas turbocharger 1 is formed in an exemplary embodiment according to FIG. 6. The exhaust gas turbocharger 1 comprises a first casing section 2 as a flow-through exhaust gas guide portion 2 which during operation of the exhaust gas turbocharger 1 is flown through by a fluid, generally by exhaust gas. The exhaust gas is generally, but not necessarily, a combustion product of a combustion engine (not shown in detail).

A second casing section 3 is associated with the exhaust gas turbocharger 1, which is formed as a bearing portion and serves to support the rotor assembly (not shown in detail) of the exhaust gas turbocharger 1. The bearing portion 3 is positioned between a flow-through air guide portion (not shown in detail) of the exhaust gas turbocharger 1 and the exhaust gas guide portion 2.

The rotor assembly (not shown in detail) comprises a compressor wheel (not shown in detail) and a turbine wheel (not shown in detail), which are connected non-rotatably with each other via a shaft (not shown in detail). The compressor wheel is arranged in a compressor wheel chamber (not shown in detail) of the air guide portion to take in generally fresh air. The turbine wheel (not shown in detail) is rotatably accommodated in a wheel chamber (not shown in detail) of the exhaust gas guide portion 2.

During operation of the exhaust gas turbocharger 1, the turbine wheel is subjected to the exhaust gas flowing through the exhaust gas guide portion 2 and driven by it so that it may perform a rotary movement. This rotary movement may be transferred to the compressor wheel via the shaft, which thereby simultaneously to the rotary movement of the turbine wheel may perform a rotary movement. By means of the compressor wheel and its rotary movement, fresh air is taken in which is compressed in the air guide portion The exhaust gas guide portion 2 comprises a first flange surface 4 at its end facing the bearing portion 3. Opposite this first flange surface 4, a second flange surface 5 of the bearing portion 3 is formed, wherein the two flange surfaces 4, 5 are formed mainly complementary.

The two flange surfaces 4, 5 are formed to extend both radially as well as in the circumferential direction relative to a longitudinal axis 6 of the exhaust gas turbocharger 1, which corresponds to an axis of rotation of the turbine wheel. The exhaust gas guide portion 2 comprises a first portion collar 7 opposite the bearing portion 3, which is associated with an axially adjacent second portion collar 8 of the bearing portion 3. The first flange surface 4 and the second flange surface 5 extend over the first portion collar 7 and the second portion collar 8, respectively.

The exhaust gas guide portion 2 and the bearing portion 3 are connected with each other by a connection device 9 in the region of the flange surfaces 4, 5. The connection device 9 comprises a first element 10 which is mainly bent in the circumferential direction and a second element 11 which is mainly bent in the circumferential direction, which on one end are detachably connected with each other by means of a first connecting element 12 and on the other end are movably connected with each other by means of a second connecting element 13, see FIG. 1 which shows the connection device 9 in a side view. The connection device 9 is basically formed like a pipe clamp connection. In other words, for the connection of the two casing sections 2, 3, a band-shaped connection device 9 is provided which at least partially encompasses the circumference of the first portion collar 7 and the second portion collar 8 in the radial, in the axial and in the circumferential direction.

Figure 1:
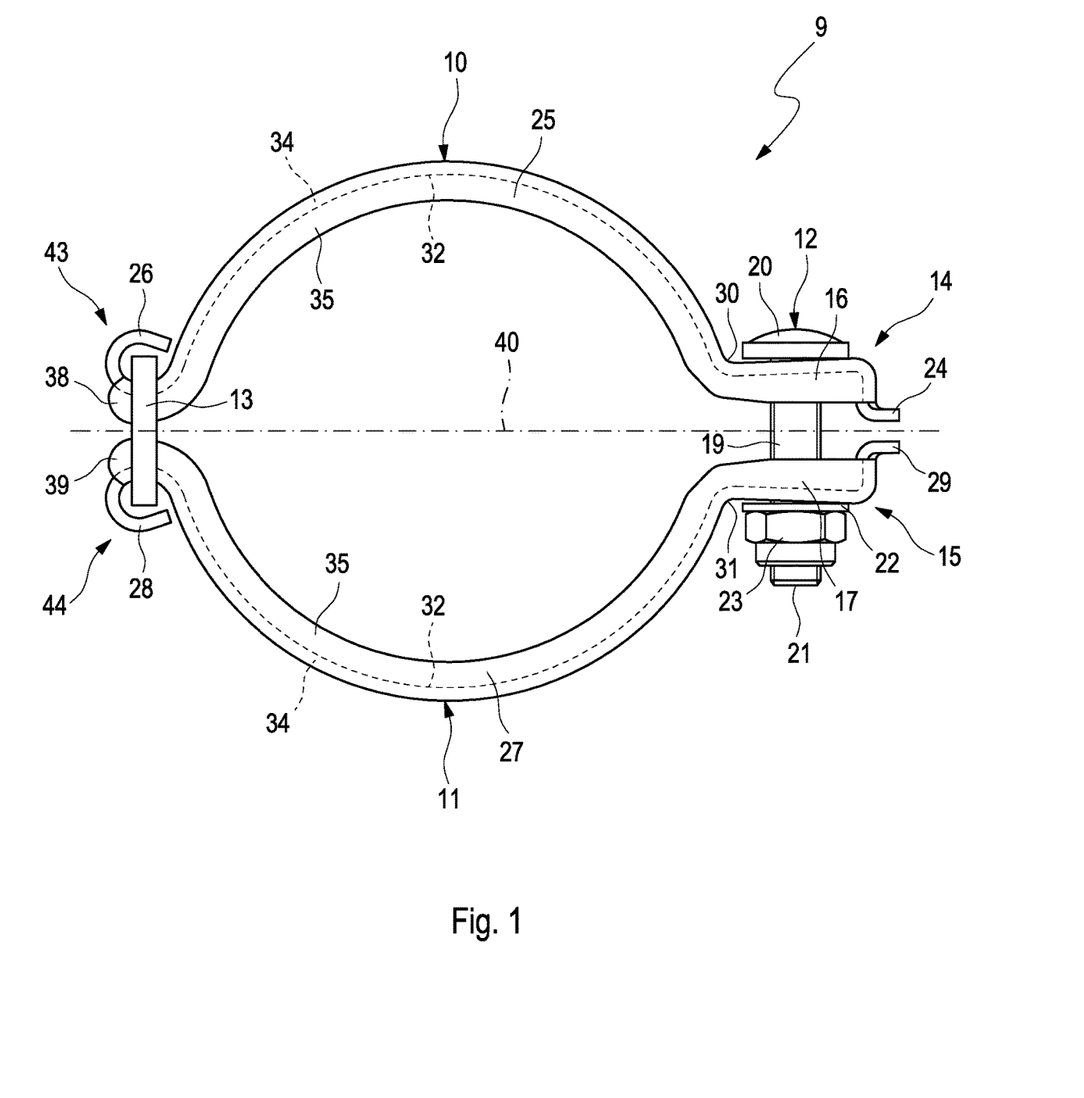
FIG. 1 shows a side view of a connection device for an exhaust gas turbocharger.

A first end region 14 of the first element 10 and a second end region 15 of the second element 11 are configured for making a connection by means of the first connecting element 12 which is formed as a screw-nut element and, for this purpose, comprise a first tensioning arm 16 and a second tensioning arm 17, respectively. In the tensioning arms 16, 17 each an opening 18 is formed through which an insert element 19 of the connecting element 12, the screw, may be inserted. A head 20 of the insert element 19 is formed to rest on the first tensioning arm 16. At the screw end 21 facing away from the head 20, a clamping disk 22 and a nut 23 are arranged, so that the two elements 10, 11 may be clamped together through a preload force of the connecting element 12.

The first element 10 extends starting from the first tensioning arm 16 with a first stop 24, over a first supporting portion 25 to a third end region 43 which comprises an eye-shaped first safety element 26. The second element 11 is formed identically and extends starting from the second tensioning arm 17 over a second supporting portion 27 to an eye-shaped second safety element 28 in a fourth end region 44. The second tensioning arm 17 comprises a second stop 29 at its first end region 14 which faces away from the second safety element 28.

Figure 2:
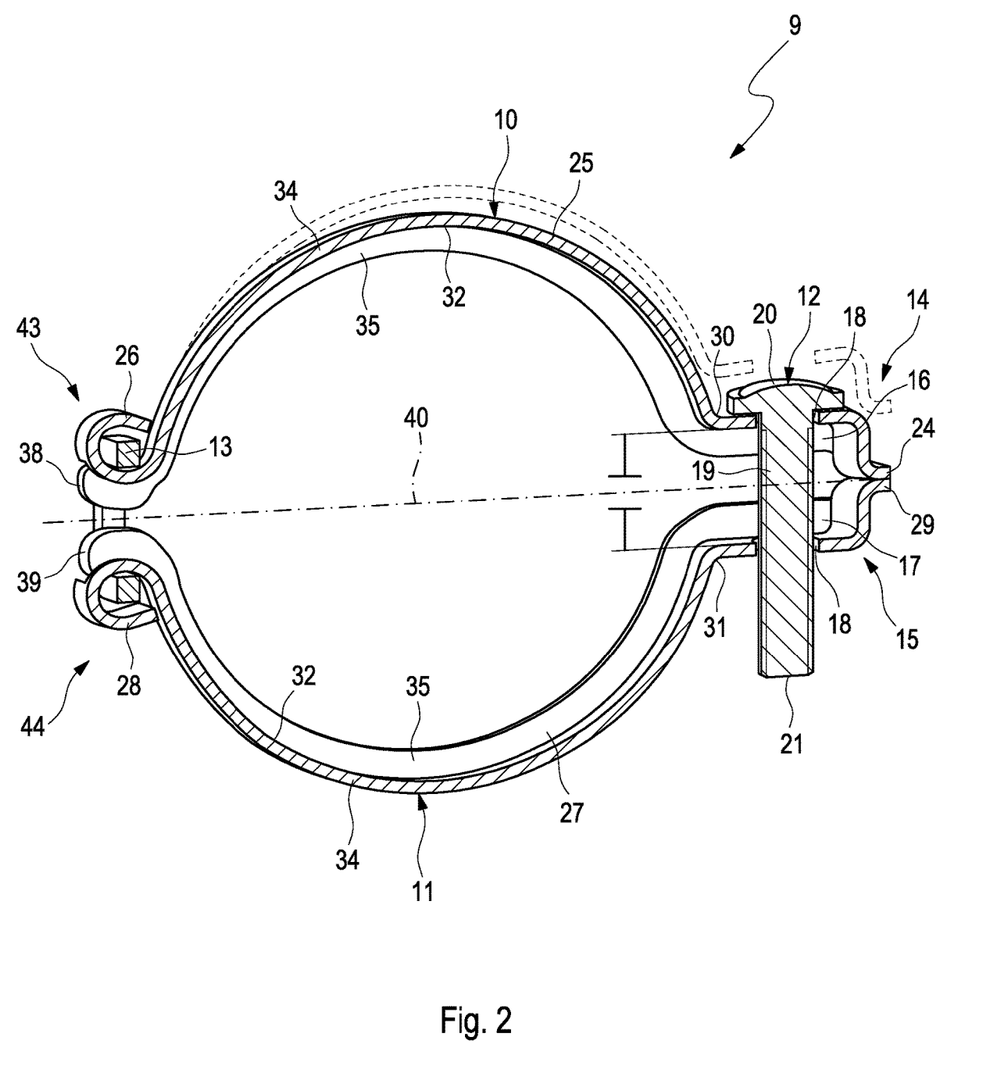
FIG. 2 shows a perspective illustration of the connection device according to FIG. 1 in a longitudinal section in the uninstalled condition.

In FIG. 2, the connection device 9 is illustrated in a perspective view in a longitudinal section, wherein the connection device 9 is shown in an uninstalled first exemplary embodiment and at least partially in a second exemplary embodiment which is depicted in broken lines.

In the first exemplary embodiment, the two tensioning arms 16, 17 are arranged essentially parallel to each other and the two stops 24, 29 are contacting each other. A first transition 30 is formed between the first tensioning arm 16 and the first supporting portion 25. Between the second tensioning arm 17 and the second supporting portion 27 a second transition 31 is also formed.

In the second exemplary embodiment, there is no contact between the stops 24, 29 and a maximum distance between the two tensioning arms 16, 17 is formed between the stops 24, 29. This means in other words that the two stops 24, 29 in the second exemplary embodiment extend conically relative to each other, wherein a minimum distance between the tensioning arms 16, 17 is formed between the transitions 30, 31.

In order to obtain a relative adaption of an inner circumference 32 of the connection device 9 to an outer circumference 33 of the portion collars 7, 8 the two elements 10, 11 are made from a profiled material with legs 35 formed between a band 34, which comprises an essentially trapezoidal profile. It could also exhibit an essentially U-shaped profile.

The transitions 30, 31 are to be implemented in such a manner that after a material reshaping of the profiled material in the region of the transitions 30, 31 a tensile stress or a compressive stress, respectively, just high enough is present in the inner or outer region, respectively, of the transitions 30, 31 so that an elastic deformation of the transitions 30, 31 for contact-making between the stops 24, 29 is possible.

An elasticity of the first transition 30 which serves to generate an axial force between legs 35 of the elements 10, 11 is achieved by means of a variable cross-section 36 of the first transition 30. This means that the variable cross-section 36 is designed in such a manner that an elastic deformation of the transition 30; 31 at a simultaneous reception of tensile or compressive stresses, respectively, is possible to introduce a circumferential stress into the supporting portion 25; 27.

Figure 5:
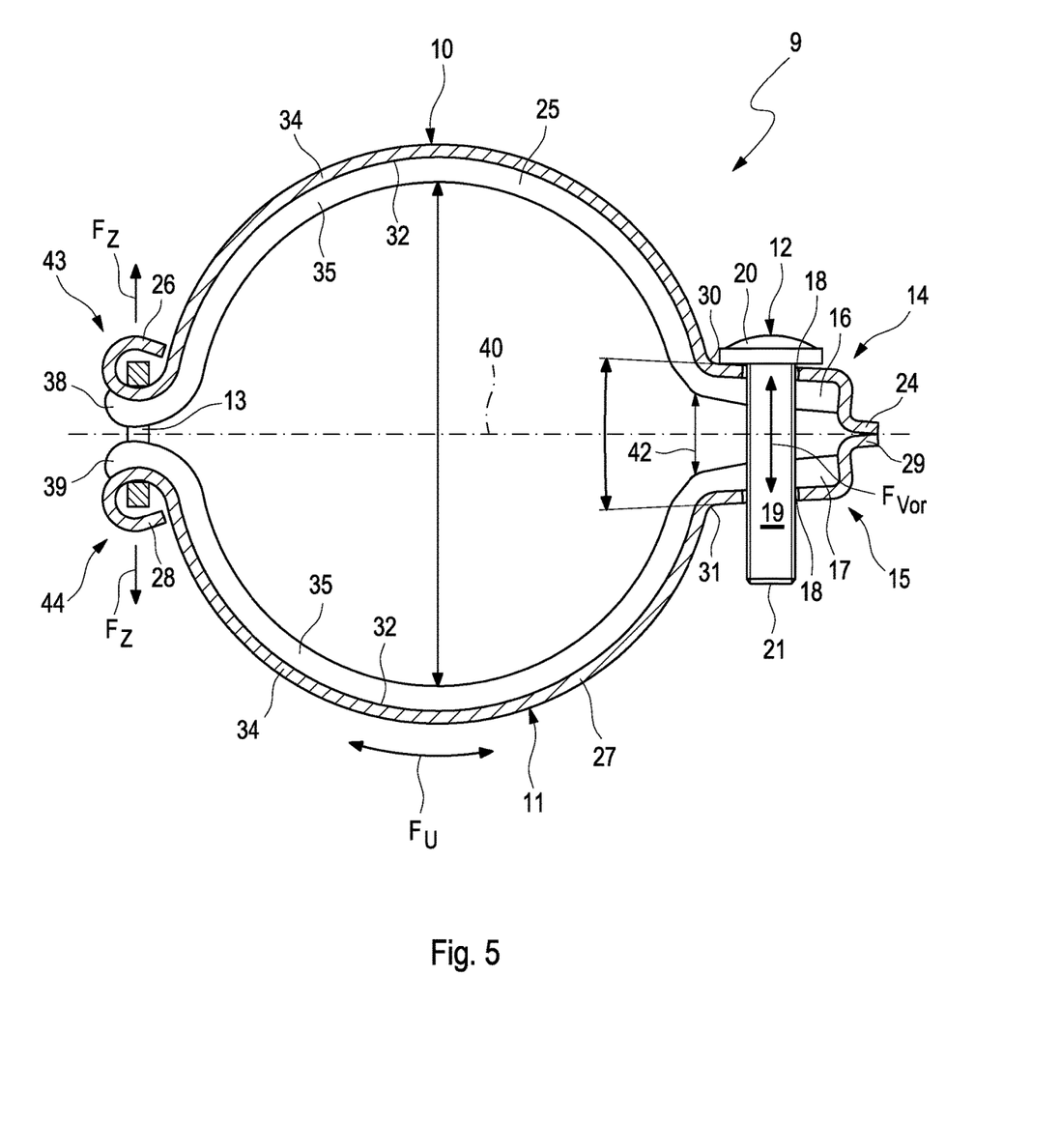
FIG. 5 shows a longitudinal section of the connection device according to FIG. 1 with a principal flow of forces.

For making a firm and unmovable connection of the two casing sections 2, 3 by means of the connection device 9, the first connecting element 12 is preloaded after positioning of the connection device 9 encompassing the two casing sections 2, 3, wherein the two stops 24, 29 are pressed upon one another until the two tensioning arms 16, 17 again lie at an angle relative to one another, wherein, however, a maximum distance is formed between the two tensioning arms 16, 17 in the region of the transitions 30, 31, see FIG. 5.

Figure 3:
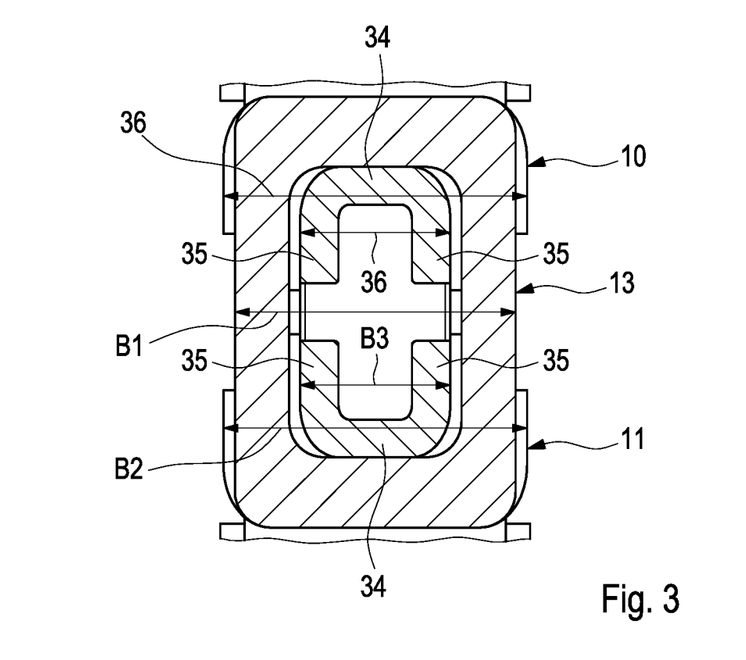
FIG. 3 shows a cross-section of an end portion of the connection device.
Figure 4:
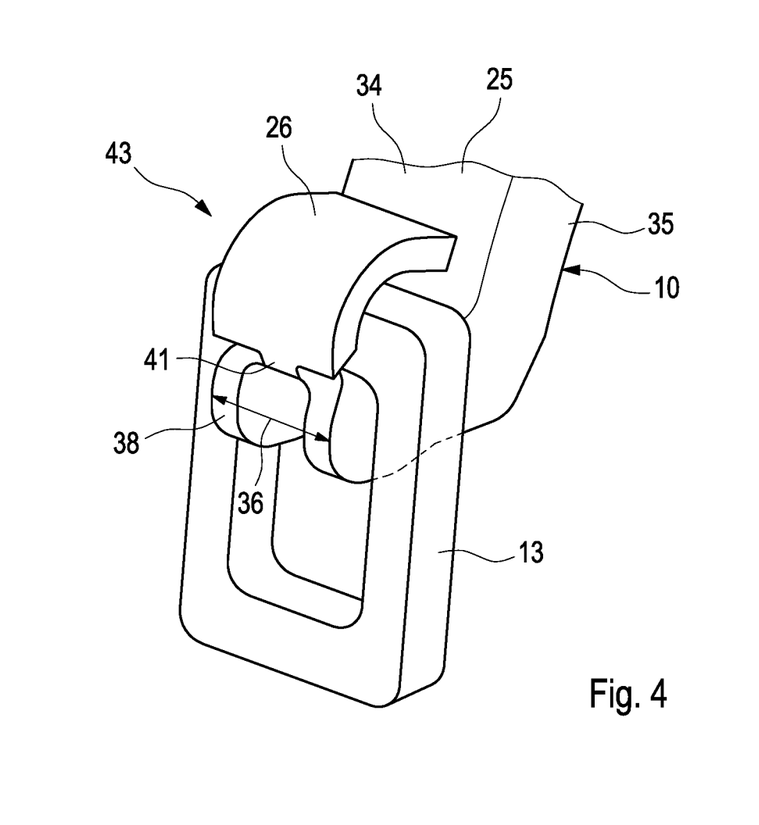
FIG. 4 shows a perspective illustration of an end of a first element of the connection device according to FIG. 1.

In order to better bring about the required axial force $F_{ax}$, a first end portion 38 of the first supporting portion 25 in the third end region 43 and a second end portion 39 of the second supporting portion 27 in the fourth end region 44 extend through the second connecting element 13, wherein the legs 35 and the band 34 are also inserted through the second connecting element 13. Because the second connecting element 13 exhibits a first width B1 which essentially corresponds to a mainly second width B2 of the elements 10, 11, the cross-section 36 of the elements 10, 11 tapers in the region of the second connecting element 13 to a third width B3 and continues with this third width B3 facing away from the supporting portions 25, 27. By means of this taper and by maintaining a profiled cross-section in the region of the second connecting element 13, a higher section modulus may be achieved.

The two end portions 38, 39 are configured in the shape of a crane hook, which means in other words that they accommodate the second connecting element 13 secured against an essentially axial displacement along an axis 40 of the connection device 9. The safety elements 26, 28 for securing the second connecting element 13 are attached at the ends of the end portions 38, 39. The safety elements 26, 28 comprise a web 41 facing the end portions 38, 39, which enables bending of the safety element 26; 28, in particular in an integral configuration with the respective elements 10, 11 requiring less effort. The safety element 26; 28 could also be connected with the end portion 38; 39 without the web 41.

FIG. 5 shows the connection device 9 with a flow of forces in the installed condition. During increasing the preload force of the first connecting element 12, the two stops 24, 29 are pressed upon each other, whereby the two tensioning arms 16, 17 are approaching each other in the region of the stops 24, 29 and a maximum distance 42 between the two tensioning arms 16, 17 is generated in the region of the transitions 30, 31.

The circumferential force Fu acting in the elements 10,11 via the preload force $F_{Vor}$ of the first connecting element 12 leads to an exact preload, which results in a higher axial force $F_{ax}$ compared to the state of the art. A tensile force $F_Z$ is exerted on the second connecting element 13 via the circumferential force Fu starting from one respective element 10; 11.

The invention claimed is:

1. A connection device for an exhaust gas turbocharger, comprising:
an essentially bent first element (10); and
an essentially bent second element (11),
wherein the first element (10) and the second element (11) are arranged opposite one another in a device plane;
wherein the first element (10) comprises a radially extending first tensioning arm (16) at a first end, and
wherein the second element (11) comprises a radially extending second tensioning arm (17) at a second end opposite the first end, and
wherein a third end of the first element (10) facing away from the first end is formed opposite a fourth end of the second element (11) and facing away from the second end, and
wherein the first tensioning arm (16) comprises a first stop (24) facing away from the third end, and
wherein the second tensioning arm (17) comprises a second stop (29) opposite the first stop (24), and
wherein the first tensioning arm (16) and the second tensioning arm (17) are connectable by a first connecting element (12) of the connection device (9), and
wherein the third end and the fourth end are movably connected with each other by a second connecting element (13), and
wherein a first elastic transition (30) is formed between the first tensioning arm (16) and a first supporting portion (25) of the first element (10), which extends between the first tensioning arm (16) and the third end, to reduce stress in the first tensioning arm (16), and
wherein a second elastic transition (31) is formed between the second tensioning arm (17) and a second supporting portion (27) of the second element (11), which extends between the second tensioning arm (17) and the fourth end, to reduce stress in the second tensioning arm (17), and
wherein the first element (10) comprises a movable connection by means of the second connecting element (13) at a first end portion (38) facing away from the first tensioning arm (16) with the second element (11) at a second end portion (39) facing away from the second tensioning arm (17), and
wherein at least one of the first element (10) or the second element (11) is formed in a profiled manner at least in a region of the second connecting element (13), and
wherein at least one of the first element (10) or the second element (11) comprises a U-shaped or trapezoidal cross-section profile perpendicular to the device plane in an area that extends through the second connecting element (13),
wherein the U-shaped or trapezoidal cross-section profile includes
a band (34) and
two legs (35) extending from opposite edges of the band (34),
wherein the second connecting element comprises an opening having two horizontal walls,
wherein the band (34) abuts one of the two horizontal walls.

2. The connection device according to claim 1,
wherein a cross-section of the first elastic transition (30) is formed variable, starting from the first tensioning arm (16) in the direction of the first supporting portion (25), or wherein a cross-section of the second elastic transition (31) is formed variable, starting from the second tensioning arm (17) in the direction of the second supporting portion (27).

3. The connection device according to claim 1,
wherein a tensile stress at an inner circumference (32) and a compressive stress, respectively, at an outer circumference (33) is generated in a region of the first elastic transition (30) and the second elastic transition (31) which enable an elastic deformation of the first elastic transition (30) and the second elastic transition (31) for contact-making between the first stop (24) and the second stop (29).

4. The connection device according to claim 1,
wherein the first tensioning arm (16) and the second tensioning arm (17) extend oppositely directed prior to being subjected to a preload force ($F_{vor}$) of the first connecting element (12),
wherein in the region of the stops (24, 29) a maximum distance (42) between the tensioning arms (16, 17) is formed.

5. The connection device according to claim 1,
wherein the first element (10) and the second element (11) are formed comprising a U-shaped or trapezoidal cross-section profile.

6. The connection device according to claim 1,
wherein the second connecting element (13) is formed as a chain link (13), and
wherein at least one of the first element (10) or the second element (11) are formed to be inserted through the chain link (13).

7. The connection device according to claim 1,
wherein the first end portion (38) or the second end portion (39) is bent, encompassing the second connecting element (13) at least partially.

8. The connection device according to claim 1,
wherein of the first element (10) comprises a safety element (26; 28) at the first end portion (38) comprising the second connecting element (13), which is formed encompassing the second connecting element (13) at least partially.

9. An exhaust gas turbocharger, comprising
a first casing section (2) and
a second casing section (3),
wherein the first casing section (2) and the second casing section (3) are connect- ed by the connection device (9) as in claim 1.

10. The connection device according to claim 1,
wherein the two legs (35) are arranged parallel to one another.

11. The connection device according to claim 10,
wherein the opening of the second connecting element is rectangular, formed by the two horizontal walls and two parallel vertical walls arranged perpendicular to the two horizontal walls,
wherein the two legs (35) extend parallel to the vertical walls.

12. The connection device according to claim 1,
wherein a width (B1) of the second connecting element perpendicular to the device plane is no larger than a width (B2) of the first element (10) perpendicular to the device plane.

* * * * *